United States Patent
King

(10) Patent No.: US 7,448,337 B1
(45) Date of Patent: Nov. 11, 2008

(54) WIND ENERGY GENERATING APPARATUS WITH DIHEDRAL SAILS

(75) Inventor: George R. King, The Woodlands, TX (US)

(73) Assignee: Larry W. Simnacher, Bay City, TX (US)

( * ) Notice: Subject to any disclaimer, the term of this patent is extended or adjusted under 35 U.S.C. 154(b) by 0 days.

(21) Appl. No.: 11/677,442

(22) Filed: Feb. 21, 2007

(51) Int. Cl.
*B63H 9/04* (2006.01)

(52) U.S. Cl. .................. 114/102.1; 416/132 B

(58) Field of Classification Search .............. 114/102.1; 416/119, 132 A, 132 B, 137, 139, 1
See application file for complete search history.

(56) References Cited

U.S. PATENT DOCUMENTS

| | | | |
|---|---|---|---|
| 4,049,362 A | 9/1977 | Rineer | |
| 4,316,699 A * | 2/1982 | Schott et al. | 416/139 |
| 4,818,180 A * | 4/1989 | Liu | 416/117 |
| 5,083,902 A * | 1/1992 | Rhodes | 416/132 B |
| 5,171,127 A | 12/1992 | Feldman et al. | |
| 5,178,086 A * | 1/1993 | Ross | 114/102.31 |
| 5,183,386 A | 2/1993 | Feldman et al. | |
| 5,823,749 A * | 10/1998 | Green | 416/132 B |
| 6,402,472 B1 | 6/2002 | Hogue et al. | |
| 2005/0263057 A1* | 12/2005 | Green | 114/102.1 |
| 2006/0056972 A1* | 3/2006 | DeLong | 416/132 B |

* cited by examiner

*Primary Examiner*—Lars A Olson
(74) *Attorney, Agent, or Firm*—Egbert Law Offices

(57) ABSTRACT

A wind energy apparatus has a shaft, a plurality of masts extending radially outwardly of the shaft, a plurality of dihedral sails respectively affixed to the plurality of masts, and a plurality of lanyards respectively connected to an outward surface of the plurality of dihedral sails. A controller is connected to the lanyards for contracting and extending the lanyards relative to the position of the masts. A generator is interconnected to the shaft for producing electrical energy relative to a rotation of the shaft.

12 Claims, 1 Drawing Sheet

WIND ENERGY GENERATING APPARATUS WITH DIHEDRAL SAILS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to wind energy generators. More particularly, the present invention relates to the blade structure of wind generator apparatus. Additionally, the present invention relates to blades of the wind generator apparatus in which the blades are formed of dihedral sails.

2. Description of Related Art Including Information Disclosed Under 37 CFR 1.97 and 37 CFR 1.98

As fossil fuel supplies dwindle, renewable energy sources will be called upon more and more to produce power. One ubiquitous source of renewable energy is wind. Even a gentle breeze has substantial energy. Wind energy increases exponentially with wind velocity. Thus, a wind of eleven miles per hour has ⅓ more energy than a wind of ten miles per hour.

The class of devices which attempt to capture and utilize wind energy are known generally as wind motors or wind energy generators. The best known device of this class, the common windmill, has been used for centuries to derive mechanical energy from wind. The typical windmill has a set of blade-like vanes projecting radially from the end of a horizontal shaft. These vanes are elevated atop a supporting tower. The vanes and their associated horizontal shaft are free to rotate about a vertical axis so that a rudder-like arrangement can keep the vanes facing into the prevailing wind. The vanes are twisted in a manner which causes wind to impart a torque, and hence a rotational motion to them. The turning of the vanes turns the horizontal shaft which is typically geared to the vertical shaft which transmits the rotational energy to the ground level.

A contemporaneous version of the wind energy generator operates propellers or other suitable wind force collectors projecting radially in a horizontal plane from a vertically-disposed central shaft or support. Wind force collectors on the wind energy generator move with the wind for half a rotation and against the wind during the other half of the rotation. In order for wind to create a net force imbalance, wind force collectors must present more aerodynamic resistance while moving with the wind than while moving against the wind. It is well known to devise such wind force collectors by taking advantage of the fact that wind force collectors rotating in a horizontal plane present one profile while moving with the wind and the opposing profile while moving against the wind.

Accordingly, wind force collectors have been provided with wind traps, shaped as cups or as hemispheres, whose open sides have high aerodynamic drag, face into the wind when moving with it and whose closed sides, having relatively low aerodynamic drag face the wind while moving against it.

One of the major problems associated with wind energy generators is the problem of wind drag loads on the blades. These loads severely limit the efficiency of the electrical generating system and they increase with increasing revolutions per minute of the blades. In the past, these undesirable effects of wind drag have been reduced by varying the blade pitch angle at the root of the blade, in a manner similar to aircraft propellers. This is accomplished through the use of complicated and expensive rotor hub assemblies which vary the pitch angle of the blade.

Blade designs operate on either the principal of drag or lift. For the drag design, the wind literally pushes the blades out of the way. Drag-powered wind turbines are characterized by slower rotational speed and high torque capabilities. The lift design of such wind turbines employs the same principle that enables airplanes, kites, and birds to fly. The blade is essentially an airfoil or wing. When the airflow passes the blade, a wind speed and pressure differential is created between the upper and lower blade surfaces. The pressure of the lower surface is greater and thus acts to "lift" the blade. The blades are attached to a central axis, such as in a wind turbine rotor, and the lift is translated into rotational motion. Lift-powered wind turbines have much higher rotational speed than drag types and therefore are better suited to electrical energy generation. Unfortunately, there are still strong drag effects which adversely affect the operation of such blade-type wind energy generators.

In the past, various patents have issued relating to wind turbines that utilize sail-type blades. U.S. Pat. No. 5,171,127, issued to Feldman, describes a vertical axis sail-bladed wind turbine. A plurality of flexible sail blades are attached to a vertically extending, rotatable shaft by upper and lower blade attachment devices. A power-absorbing leg device is coupled to the rotatable shaft. The flexible sail blades are deployed and stabilized in operation by the centrifugal forces produced in response to rotation of the blades about the vertical axis of the shaft. The sail blades are formed of elongate flexible sail panels. Flyweights are disposed between and secured to the ends of pairs of the sail panels. The blade is deployed so as to optimize energy capture. U.S. Pat. No. 5,183,386, issued to the same inventor, teaches that each of the sail panels is formed of a membrane of a woven or non-woven fabric, plastic or other material. A leading edge strength member, formed of a flexible cable of suitable material, is attached to the leading edge of the sail panel. The leading edge member is enclosed in a suitably-shaped aerodynamic fairing. The leading and trailing members take on the concave shape of the membrane edges to which they are attached. The curvatures of the leading edges of the panel will be correspondingly less than that of the trailing edges of the panels.

U.S. Pat. No. 4,049,362, issued to Rineer, describes another type of vertical axis wind-driven rotor assembly. This sails of this assembly are articulated to provide driving and feathering airfoil positions. The airfoils are triangular in shape with an apex extending downwardly. The degree of feathering action takes place as a result of wind pressure. This causes the panels to remain in an intermediate position between the extremes of articulation. The point of pivotal mounting of the airfoils is selected with regard to the center of the airfoil panel to assure that center of pressure is behind (with respect to the direction of rotation of the rotor) a line connecting the points of pivotal mounting of the air foil panels. As such, the configurations of the airfoils will be adjusted depending on the pressure exerted by the wind.

U.S. Pat. No. 6,402,472, issued to Hogue, teaches another type of sail-bladed windmill wheel in which the sails are mounted around a horizontally extending rotor. In high winds, a drawbar extension allows the angles of the blades to increase to a point where the area that the wind wheel presents to the wind is significantly reduced. The force of the wind behind the wheel is limited to a value that the wind wheel support surfaces can withstand. As the blade angle of the sail increases beyond the optimum, the sail becomes less and less efficient in capturing energy from the wind. As such, the sails will detach under those circumstances when excess wind is encountered by the sails.

It is an object of the present invention to provide a wind energy generator apparatus which minimizes the amount of drag affecting the blades.

It is another object of the present invention to provide a wind energy generator apparatus which maximizes the capture of wind and the force exerted by the wind on the blades.

It is another object of the present invention to provide a wind energy generator apparatus which minimizes the cost of the blade structure.

It is a further object of the present invention to provide a wind energy generator apparatus which facilitates the ability to recover energy from the apparatus and to facilitate the ability to repair and/or replace the generator mechanisms.

It is still another object of the present invention to provide a wind energy generator apparatus which maximizes the aerodynamic characteristics of the blades and the supporting structure.

These and other objects and advantages of the present invention will become apparent from a reading of the attached specification and appended claims.

BRIEF SUMMARY OF THE INVENTION

The present invention is a wind energy generator apparatus that comprises a first mast having a dihedral sail affixed thereto, a second mast having a dihedral sail affixed thereto, a third mast having a dihedral sail affixed thereto, a controller connected to each of the dihedral sails for controlling an orientation of the dihedral sails relative to a position of the masts, and a generator for producing electrical energy relative to a rotation of the masts. A shaft is connected to the masts such that the masts extend radially outwardly of the shaft.

In the present invention, the controller includes a first lanyard that is connected to the dihedral sail of the first mast, a second lanyard connected to the dihedral sail of the second mast, and a third lanyard connected to the dihedral sail of the third mast. The controller serves to extend and retract the respective lanyards relative to the position of the respective masts. The first lanyard is connected to a corner of the dihedral sail of the first mast. The second lanyard is connected to a corner of the dihedral sail of the second mast. The third lanyard is connected to a corner of the dihedral sail of the third mast. Each of the dihedral sails has a first edge extending along a length of the respective mast. Each of the dihedral sails includes a second edge that extends at an acute angle with respect to the mast to the corner thereof. Each of the dihedral sails has a plurality of ribs extending thereacross. These ribs extend generally transverse to the respective mast so as to maintain a proper cupped configuration when the lanyard is retracted.

In the present invention, a pole is interconnected to the shaft so as to support the masts at a desired location above the earth. The generator is positioned adjacent to a bottom of the pole. Each of the masts is cone-shaped with a wide diameter proximal to the shaft and a narrow diameter distal the shaft. The controller serves to retract one of the dihedral sails while another of the dihedral sails is extended.

The present invention is also a blade for a wind turbine that comprises a mast, a dihedral sail having a first edge affixed to and extending along the mast and a second edge extending at an acute angle from one end of the first edge so as to terminate in an outward corner of the dihedral sail, a lanyard connected to this corner of the dihedral sail, and a controller cooperative with the lanyard for extending and retracting the lanyard. The controller serves to move the dihedral sail between an open configuration and a cupped configuration. The mast is cone-shaped with a wide diameter at one end and a narrow diameter at an opposite end generally adjacent to the juncture of the first edge with the second edge of the dihedral sail.

DETAILED DESCRIPTION OF THE INVENTION

Figure 1:
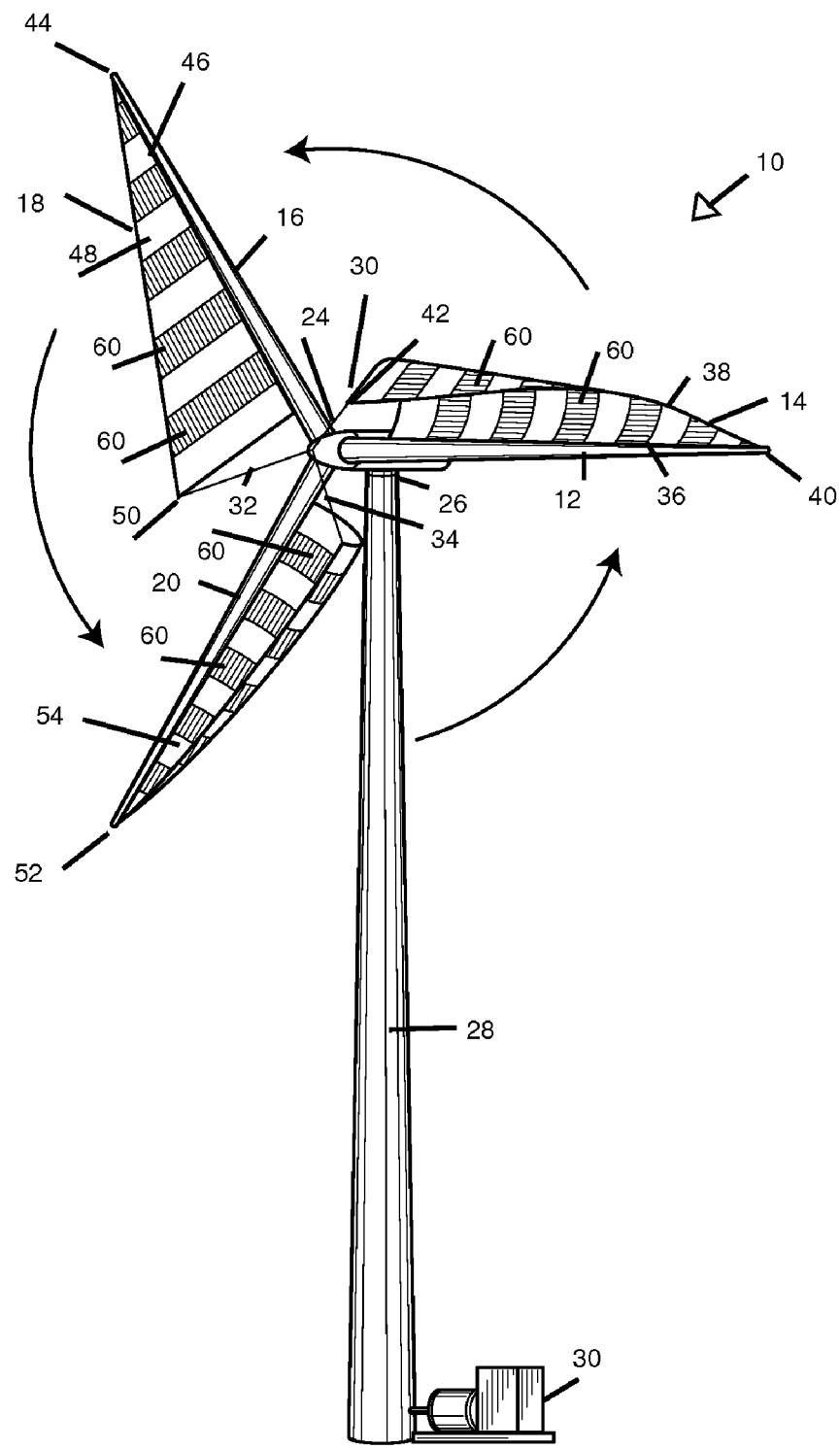
FIG. 1 is a perspective view showing the wind energy apparatus in accordance with the preferred embodiment of the present invention.

Referring to FIG. 1, there is shown the wind energy generator apparatus 10 in accordance with the preferred embodiment of the present invention. The wind energy generator apparatus 10 has a first mast 12 with a dihedral sail 14 affixed thereto. The wind energy generator apparatus 10 also includes a second mast 16 having a dihedral sail 18 affixed to and extending outwardly therefrom. Additionally, the wind energy generator apparatus 10 has a third mast 20 with a dihedral sail 22 affixed thereto. Each of the masts 12, 16 and 20 extends radially outwardly of a shaft 24. The shaft 24 is pivotally connected at 26 to the top of a pole 28. A generator 30 is cooperative with the shaft 24. The generator 30 is located adjacent to the bottom of the pole 28. A controller is cooperative with each of the sails 14, 18 and 22 so as to control an orientation of the respective dihedral sails 14, 18 and 22 relative to a position of the masts 12, 16 and 20. The controller includes a first lanyard 30 that is connected to the dihedral sail 14. The controller also include a second lanyard 32 that is connected to the dihedral sail 18. Additionally, and furthermore, the controller includes a third lanyard 34 that is connected to the dihedral sail 22. Each of the lanyards 30, 32 and 34 will extend from a mechanism associated with shaft 24. The controller serves to extend and retract the lanyards 30, 32 and 34 relative to a position of the respective masts 12, 16 and 20.

The mast 12 is generally cone-shape with a wide diameter at the shaft 24 and a narrow diameter at an opposite end thereof. The dihedral sail 14 has one edge 36 affixed to and extending longitudinally along the mast 12. The dihedral sail 14 has a second edge 38 which forms a juncture with the first edge 36 adjacent to the narrow diameter end 40 of the mast 12. The second edge 38 extends to a corner 42 formed at an end of the second edge 38 opposite the end 40 of mast 12. The lanyard 30 is connected to the corner 42 of the dihedral sail 14.

The second mast 16 is similarly cone-shaped with a wide diameter affixed to the shaft 24 and a narrow diameter at opposite end 44. The dihedral sail 18 has one edge 46 which extends longitudinally along the mast 16. A second edge 48 extends from the end 44 of the mast 16 outwardly from the mast at an acute angle. The lanyard 32 is connected to a corner 50 of edge 48 opposite the end 44 of mast 16.

The third mast 20 is also cone-shaped with a wide diameter at the shaft 24 and a narrow diameter at an opposite end 52. The first edge 54 of the dihedral sail 22 extends longitudinally along the mast 20. A second edge 56 extends at an acute angle from the first edge 54 and from the end 52 of mast 20. The second edge 56 extends to a corner 58 opposite to the end 52 of mast 20. The lanyard 34 is connected to the corner 58 of the dihedral sail 22.

It can be seen that each of the sails 14, 18 and 22 has a plurality of ribs 60 extending thereacross in generally transverse relationship to the respective masts 12, 16 and 20. These ribs extend from the respective masts 12, 16 and 22 to the second edge 38, 48 and 56 of the respective dihedral sails 14, 18 and 22. These ribs 60 are formed of carbon filaments that are particularly configured so as to maintain each of the dihedral sails 14, 18 and 22 in a cupped configuration when the respective lanyards 30, 32 and 34 are retracted. As such, the ribs 60 provide structural integrity to the respective dihedral sails 14, 18 and 22.

In FIG. 1, it can be seen that the shaft 24 is pivotally mounted at 26 to the top of the pole 28. The generator 30 is connected adjacent to the bottom of the pole 28. A torque tube will extend through the interior of the pole 28 so as to transfer rotational energy of the shaft 24 as rotational energy to the generator 30. Since the generator 30 is located adjacent to the bottom of the pole 28 and generally at the surface of the earth, generator 30 can be easily connected to supply power, can be easily repaired and can be easily replaced. As such, the wind energy generator apparatus 10 of the present invention avoids the need for hoists, cranes, lifts and other devices that would be otherwise required to maintain and/or replace equipment located at the top of the pole 28.

In FIG. 1, it can be seen that the sail 14 is formed into a cupped configuration by retracting the lanyard 30 toward the shaft 24. This draws the corner 42 toward the shaft 24 and creates the cupped configuration of the dihedral sail 14. The lanyard 32 associated with the dihedral sail 18 is extended so that the dihedral sail 18 has a generally open configuration. The lanyard 34 is intermediately retracted so as to draw the dihedral sail 22 into a semi-cupped configuration. The ribs serve to set the curvature when the lanyard is drawn in. As such, the sail 14 will cup to a predetermined curvature. The ribs 60 serve to maintain it in this cupped shaped. As the turbine tacks into the wind, the ribs 60 serve to assure that the dihedral sail avoid collapse. As such, the use of the ribs 60 enhances the torque-producing capability of the wind energy generator apparatus 10.

In FIG. 1, it can be seen that the dihedral sail 14 is fully cupped so as to receive the full force of the wind. As such, the mast 12 receives the full power associated with the wind energy and transfers such power to the shaft 24. The dihedral sail 18 is in a feathered condition. The lanyard 32 is relaxed so that only a small amount of rotational torque is created. The dihedral sail 22 is not fully cupped. As such, it provides reduced torque. The shape of the particular blades associated with the wind energy generator apparatus 10 of the present invention serve to reduce the drag coefficient of the blade because of the way the wind fills the curvature of the dihedral sails. One dihedral sail is emptying as another is filling. The sails of the present invention are cupped to a 22° angle relative to the center line of the oucell and the direction of the wind. As such, the wind flows directly into the cupped portion of the sails.

In the wind energy generator apparatus 10 of the present invention, wind will get caught in the cup formed by the dihedral sail. As such, it receives the maximum force of the wind. This cupped blade will rotate until the next blade comes into the fill angle. As such, there are two blades that are gaining pressure between 116° to 120°. At 120°, the dihedral sail starts to empty so that the next blade can start to fill. At 40°, the blade starts to receive the maximum amount of pressure. In particular, dihedral sail 14 is at maximum force while dihedral sail 18 is emptying and while dihedral sail 22 is starting to fill. Power spikes occur every 120° of motion. The sum of the pressures will equal the amount of torque which is produced by the wind energy generator apparatus 10.

The blades of the wind energy generator apparatus 10 are "pushed" around in a circle instead of being lifted as in the nature of conventional blades. The sails 14, 18 and 22 of the present invention do not rely on external surfaces for torque. The wind only pushes on the interior surfaces of the respective sails. The effective wind-receiving area is the entire surface area of the interior of the sail. The filling and emptying process of the present invention can occur without turbulence so as to create the requisite torque for the production of energy.

The foregoing disclosure and description of the invention is illustrative and explanatory thereof. Various changes in the details of the illustrated construction can be made within the scope of the appended claims without departing from the true spirit of the present invention. The present invention should only be limited by the following claims and their legal equivalents.

I claim:

1. A wind energy apparatus comprising:
    a first mast having a dihedral sail affixed thereto;
    a second mast having a dihedral sail affixed thereto;
    a third mast having a dihedral sail affixed thereto;
    a controlling means connected to each of said dihedral sails for controlling an orientation of each of said dihedral sails relative to a position of each of said first, second and third masts;
    a generating means for producing electrical energy relative to a rotation of said first, second and third masts; and
    a shaft connected to said first mast and said second mast and said third mast, each of said first mast and said second mast and said third mast extending radially outwardly of said shaft, each of said first mast and said second mast and said third mast being cone-shaped with a wide diameter proximal to said shaft and a narrow diameter distal said shaft.

2. The apparatus of claim 1, said controlling means comprising:
    a first lanyard connected to said dihedral sail of said first mast;
    a second lanyard connected to said dihedral sail of said second mast; and
    a third lanyard connected to said dihedral sail of said third mast.

3. The apparatus of claim 2, said controlling means for extending and contracting said first, second and third lanyards relative to the position of said first, second and third masts.

4. The apparatus of claim 2, said first lanyard being connected to a corner of said dihedral sail of said first mast, said second lanyard being connected to a corner of said dihedral sail of said second mast, said third lanyard being connected to a corner of said dihedral sail of said third mast.

5. The apparatus of claim 4, said dihedral sail of said first mast having a first edge extending along a length of said first mast, said dihedral sail of said first mast having a second edge extending at an acute angle with respect to said first edge to said corner thereof, said dihedral sail of said second mast having a first edge extending along a length of said second mast, said dihedral sail of second mast having a second edge extending at an acute angle with respect to said first edge of said second mast to said corner thereof, said dihedral sail of said third mast having a first edge extending along a length of said third mast, said dihedral sail of said third mast having a second edge extending an acute angle with respect to said first edge of said third mast to said corner thereof.

6. The apparatus of claim 1, each of said dihedral sails having a plurality of ribs extending thereacross.

7. The apparatus of claim 6, each of said plurality of ribs extending generally transverse to the respective mast.

8. The apparatus of claim 1, further comprising:
a pole interconnected to said shaft so as to support said first mast and said second mast and said third mast at a desired location above the earth, said generator means positioned adjacent to a bottom of said pole.

9. A blade for a wind turbine comprising:
a mast;
a dihedral sail having a first edge affixed to and extending along said mast, said dihedral sail having a second edge extending at an acute angle from one end of said first edge, said second edge extending to an outward corner of said dihedral sail;
a lanyard connected to said corner of said dihedral sail; and
a controlling means cooperative with said lanyard for extending and retracting said lanyard, said controlling means for moving said dihedral sail between an open configuration and a cupped configuration.

10. The blade of claim 9, said dihedral sail having a plurality of ribs extending thereacross.

11. The blade of claim 10, each of said plurality of ribs extending generally transverse to the respective mast.

12. The blade of claim 9, said mast being cone-shaped with a wide diameter at one end and a narrow diameter at an opposite end, said narrow diameter being adjacent the connection of said first edge with said second edge.

\* \* \* \* \*